United States Patent
Li et al.

(10) Patent No.: US 12,441,845 B2
(45) Date of Patent: Oct. 14, 2025

(54) SILOXANE MONOMER, CONTACT LENS COMPOSITION AND CONTACT LENS

(71) Applicant: PEGAVISION CORPORATION, Taoyuan (TW)

(72) Inventors: Ting-Yu Li, Taoyuan (TW); Min-Yung Huang, Taoyuan (TW)

(73) Assignee: PEGAVISION CORPORATION, Taoyuan (TW)

( * ) Notice: Subject to any disclaimer, the term of this patent is extended or adjusted under 35 U.S.C. 154(b) by 514 days.

(21) Appl. No.: 18/106,894

(22) Filed: Feb. 7, 2023

(65) Prior Publication Data

US 2024/0132670 A1   Apr. 25, 2024

(30) Foreign Application Priority Data

Sep. 30, 2022 (TW) ................................. 111137128

(51) Int. Cl.
| | | |
|---|---|---|
| C08G 77/14 | (2006.01) | |
| C08K 5/07 | (2006.01) | |
| C08K 5/11 | (2006.01) | |
| C08K 5/5397 | (2006.01) | |
| G02B 1/04 | (2006.01) | |

(52) U.S. Cl.
CPC .............. C08G 77/14 (2013.01); C08K 5/07 (2013.01); C08K 5/11 (2013.01); C08K 5/5397 (2013.01); G02B 1/043 (2013.01)

(58) Field of Classification Search
CPC combination set(s) only.
See application file for complete search history.

(56) References Cited

U.S. PATENT DOCUMENTS

| | | | | |
|---|---|---|---|---|
| 4,259,467 | A * | 3/1981 | Keogh ............... | C08F 283/124 602/41 |
| 5,908,906 | A * | 6/1999 | Kunzler ............. | G02B 1/043 526/279 |
| 8,129,442 | B2 * | 3/2012 | Ueyama ............. | G02B 1/043 526/263 |
| 9,056,879 | B2 * | 6/2015 | Li ....................... | C08G 77/458 |
| 9,140,908 | B2 * | 9/2015 | Ge ...................... | G02C 7/049 |
| 9,248,928 | B2 * | 2/2016 | Rogers ............... | B65B 23/00 |
| 9,322,959 | B2 * | 4/2016 | Ueyama ............. | C08G 77/20 |
| 9,360,594 | B2 * | 6/2016 | Liu ..................... | G02B 1/043 |
| 9,429,683 | B2 * | 8/2016 | Rashid ............... | C08G 18/61 |
| 9,637,582 | B2 * | 5/2017 | Chang ................ | C08L 83/14 |
| 10,081,697 | B2 * | 9/2018 | Huang ............... | C08F 290/068 |
| 10,138,316 | B2 * | 11/2018 | Chang ................ | C08F 220/40 |
| 10,227,435 | B2 * | 3/2019 | Chang ................ | G02B 1/043 |
| 11,125,916 | B2 * | 9/2021 | Alli .................... | B29D 11/00048 |
| 2009/0234089 | A1 * | 9/2009 | Ueyama ............. | C08F 8/42 526/279 |
| 2012/0088843 | A1 * | 4/2012 | Chang ................ | C08G 77/46 514/772.3 |
| 2012/0088844 | A1 * | 4/2012 | Kuyu ................. | C08G 77/42 514/772.3 |
| 2012/0218509 | A1 * | 8/2012 | Back .................. | C08L 83/04 351/159.33 |
| 2012/0220743 | A1 * | 8/2012 | Francis .............. | C08F 230/08 526/279 |

(Continued)

FOREIGN PATENT DOCUMENTS

| | | | |
|---|---|---|---|
| CA | 2873437 A1 | 6/2016 | |
| CN | 103620480 B | 12/2015 | |

(Continued)

*Primary Examiner* — Peter A Salamon
(74) *Attorney, Agent, or Firm* — Li & Cai Intellectual Property (USA) Office

(57) ABSTRACT

A siloxane monomer, a contact lens composition, and a contact lens are respectively provided. The siloxane monomer is represented by Chemical Formula 1 below:

[Chemical Formula 1]

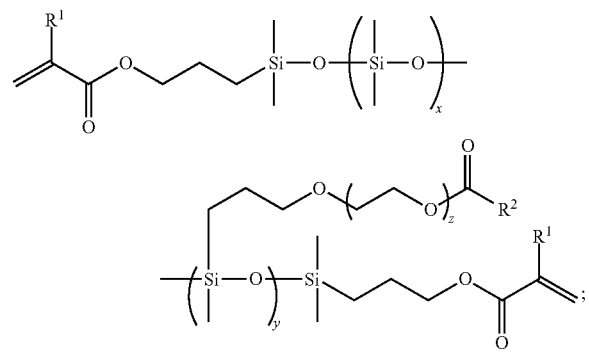

where $R^1$ is H or $CH_3$; $R^2$ is $NHR^3$, $N(R^3)_2$, $OR^3$, $SR^3$, or

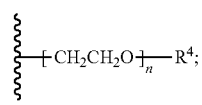

$R^3$ is

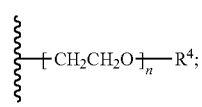

and $R^4$ is H or an alkyl group having a carbon chain length of C1 to C6; where x is greater than or equal to 0, y is greater than or equal to 1, and z is greater than or equal to 0.

10 Claims, No Drawings

(56) References Cited

U.S. PATENT DOCUMENTS

| | | | | |
|---|---|---|---|---|
| 2016/0090432 A1* | 3/2016 | Chang | ............... | C08G 77/445 |
| | | | | 526/279 |
| 2017/0166674 A1* | 6/2017 | Chang | ............... | C08G 77/20 |
| 2017/0329052 A1* | 11/2017 | Chan | ............... | G02B 1/043 |
| 2018/0009922 A1* | 1/2018 | Alli | ............... | G02B 1/043 |
| 2018/0011223 A1* | 1/2018 | Alli | ............... | G02B 1/043 |
| 2018/0354214 A1* | 12/2018 | Wu | ............... | G02B 1/043 |
| 2019/0135985 A1* | 5/2019 | Hebel | ............... | C08G 77/14 |
| 2019/0366659 A1* | 12/2019 | Breitkopf | ......... | B29D 11/00038 |
| 2019/0366660 A1* | 12/2019 | Ge | ............... | C08F 226/10 |

FOREIGN PATENT DOCUMENTS

| | | |
|---|---|---|
| CN | 108948282 A | 12/2018 |
| EP | 2492719 A1 | 8/2012 |
| JP | 5694324 A | 7/1981 |
| JP | 2015528586 A | 9/2015 |
| JP | 2017531074 A | 10/2017 |
| JP | 2019504140 A | 2/2019 |
| JP | 2021185246 A | 12/2021 |
| TW | I506334 B | 11/2015 |
| TW | 201739840 A | 11/2017 |
| TW | 202233704 A | 9/2022 |
| WO | WO 2013142062 A2 | 9/2013 |
| WO | WO 2019112255 A1 | 6/2019 |

* cited by examiner

SILOXANE MONOMER, CONTACT LENS COMPOSITION AND CONTACT LENS

CROSS-REFERENCE TO RELATED PATENT APPLICATION

This application claims the benefit of priority to Taiwan Patent Application No. 111137128, filed on Sep. 30, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a siloxane monomer, and more particularly to a siloxane monomer, a contact lens composition, and a contact lens.

BACKGROUND OF THE DISCLOSURE

In the related art, a conventional silicone hydrogel contact lens can effectively improve an oxygen transmission rate (DK). The conventional silicone hydrogel contact lens includes a poly-siloxane hydrogel material formed by copolymerization of a hydrophilic silicon-containing polymer and a hydrophilic monomer (e.g., NVP, DMA, MAA). However, a surface of the poly-siloxane hydrogel material is hydrophobic, which can easily lead to growth of bacteria and cause inflammation of the eyes. Therefore, the surface of the poly-siloxane hydrogel material usually needs to be modified to improve a surface wettability.

SUMMARY OF THE DISCLOSURE

In response to the above-referenced technical inadequacies, the present disclosure provides a siloxane monomer, a contact lens composition, and a contact lens, which can effectively improve wettability of a surface of the contact lens, and does not require a surface hydrophilic coating treatment.

In one aspect, the present disclosure provides a siloxane monomer represented by Chemical Formula 1 below and used in preparation of a contact lens.

[Chemical Formula 1]

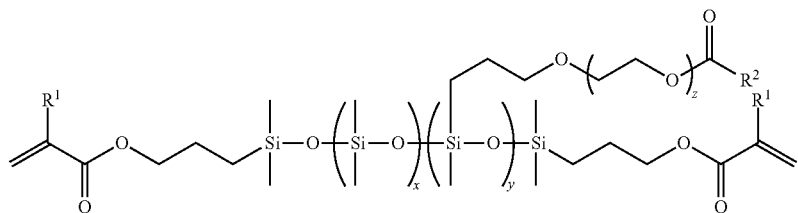

In the [Chemical Formula 1], $R^1$ is H or $CH_3$; $R^2$ is $NHR^3$, $N(R^3)_2$, $OR^3$, $SR^3$, or

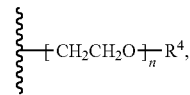

where n is not greater than 6; $R^3$ is

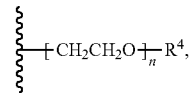

where n is not greater than 6; $R^4$ is H or an alkyl group having a carbon chain length of C1 to C6; and x is greater than or equal to 0, y is greater than or equal to 1, and z is greater than or equal to 0.

In certain embodiments, a weight average molecular weight (Mw) or a number average molecular weight (Mn) of the siloxane monomer is between 500 g/mol and 50,000 g/mol.

In another aspect, the present disclosure provides a contact lens composition that includes siloxane monomers, a hydrophilic monomer, a crosslinking agent, and an initiator.

The siloxane monomers include a first siloxane monomer, and the first siloxane monomer is represented by Chemical Formula 1 below.

[Chemical Formula 1]

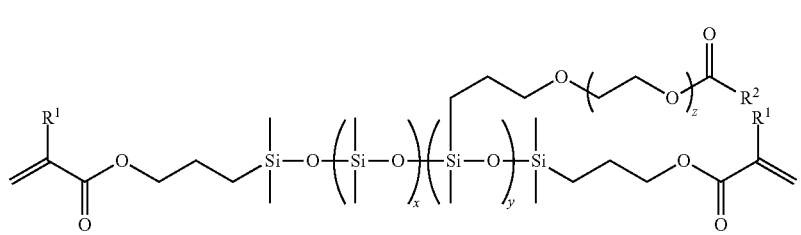

In the [Chemical Formula 1], $R^1$ is H or $CH_3$; $R^2$ is $NHR^3$, $N(R^3)_2$, $OR^3$, $SR^3$, or

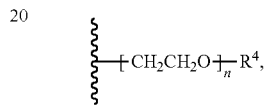

where n is not greater than 6; $R^3$ is

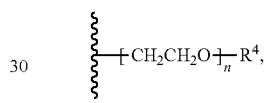

where n is not greater than 6; $R^4$ is H or an alkyl group having a carbon chain length of C1 to C6; and x is greater than or equal to 0, y is greater than or equal to 1, and z is greater than or equal to 0.

In certain embodiments, the siloxane monomers further include at least one of a second siloxane monomer, a third siloxane monomer, and a fourth siloxane monomer. The second siloxane monomer is represented by Chemical Formula 2 below.

[Chemical Formula 2]

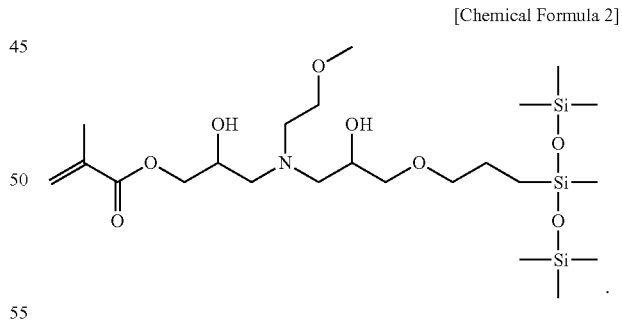

The third siloxane monomer is represented by Chemical Formula 3 below.

[Chemical Formula 3]

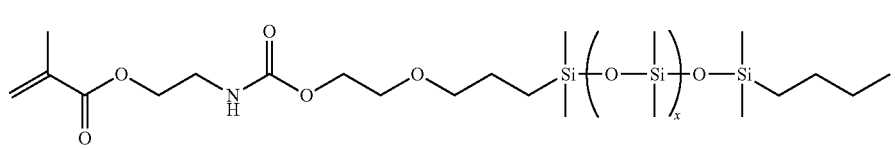

The fourth siloxane monomer is (3-methylacryloxy-2-hydroxy-propoxy)propylbis(trimethylsiloxy)methylsilane.

In certain embodiments, based on a total weight of the contact lens composition being 100 parts by weight, an amount of the first siloxane monomer is between 1 part by weight and 30 parts by weight, an amount of the second siloxane monomer is not greater than 40 parts by weight, an amount of the third siloxane monomer is not greater than 40 parts by weight, and an amount of the fourth siloxane monomer is not greater than 30 parts by weight.

In certain embodiments, the hydrophilic monomer is at least one material selected from a group consisting of: 2-hydroxyethyl methacrylate (HEMA), methyl methacrylate (MMA), methacrylic acid (MAA), N-vinyl-pyrrolidone (NVP), N,N-dimethyl-acrylamide (DMA), 4-acryloylmorpholine (AcMO), 2-hydroxyethyl acrylamide (HEAA), glyceryl methacrylate (GMA), glycerol mono-meth acrylate (GMMA), acrylic acid (AA), N-vinyl-N-methyl acetamide, glycine vinyl carbonate, 2-methacryloyloxyethyl phosphorylcholine, and 2-hydroxy-butyl methacrylate. An amount of the hydrophilic monomer is between 30 parts by weight and 70 parts by weight.

In certain embodiments, the crosslinking agent is at least one material selected from a group consisting of: poly(ethylene glycol) diacrylate (PEGDA), ethylene glycol di(methacrylate) (EGDMA), di(ethylene glycol) di(methacrylate) (DEGDMA), tri(ethylene glycol) di(methacrylate) (TEGDMA), tetra(ethylene glycol) di(methacrylate) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-Triallyl-1,3,5-triazine-2,4,6(1H,3H,5H)-trione, 1,1,1-tri(methylolpropane) tri(methacrylate), tri(methylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(acrylate). An amount of the crosslinking agent is between 0.01 parts by weight and 5 parts by weight.

In certain embodiments, the initiator is at least one material selected from a group consisting of: bis(2,6-difluoro-3-(1-hydropyrrol-1-yl)-phenyptitanocene, phenylbis-(2,4,6-trimethylbenzoyl)-phosphine oxide, and 2-hydroxy-2-methyl-1-phenyl-1-porpanone. An amount of the initiator is between 0.01 parts by weight and 2 parts by weight.

In yet another aspect, the present disclosure provides a contact lens, which is made of the contact lens composition mentioned above. The contact lens has the following characteristics. A surface of the contact lens has a hysteresis of less than 30°, and a dyeing penetration rate of the contact lens is greater than 70% after being dyed with Sudan black dye.

In certain embodiments, the contact lens further has the following characteristics: (i) an oxygen permeability between 40 Barrers and 150 Barrers; (ii) an equilibrium water content between 30% and 80%; (iii) the hysteresis between 0° and 30°; (iv) the dyeing penetration rate between 70% and 99.9%; (v) a tensile modulus between 0.1 MPa and 0.8 MPa; and (vi) an elongation between 100% and 500%.

Therefore, by virtue of introducing a siloxane monomer having a specific hydrophilic structure into a contact lens composition, the siloxane monomer, the contact lens composition and the contact lens of the present disclosure enable hydrophilicity of a lens surface of the contact lens to be improved without a surface treatment for a hydrophilic coating.

The technique adopted in the present disclosure can increase diversity of the chemical structure of the siloxane monomer. In addition, since a chemical structure of ketone has a resonance formula, the ketone can cause a polarization phenomenon of charge separation. The $R^2$ substituent is a multi-electron atom X (i.e., N, O, S), which can promote a polarization phenomenon of charge separation, thereby increasing ionicity of the siloxane monomer, and being conducive to improving the hydrophilicity and moisture retention of the contact lens.

Furthermore, the contact lens formed of the contact lens composition of the present disclosure can have an excellent surface hydrophilic property, so that a treatment for a hydrophilic surface coating is unnecessary.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In the present disclosure, in order to describe a specific numerical range, the term "a numerical value to another numerical value" is used in the present disclosure, which should be interpreted as covering any value within the numerical range and a smaller numerical range defined by any value within the numerical range. The arbitrary numerical value and the smaller numerical range are clearly stated in the specification. In addition, for the sake of brevity, the structure of each polymer or group in the present disclosure is sometimes expressed in a skeletal formula, and carbon atoms, hydrogen atoms, and carbon-hydrogen bonds in the actual structure are omitted. However, when a specific atom or group of atoms is clearly depicted in the structural formula, the structural formula is based on the depicted one.

Siloxane Monomer

An embodiment of the present disclosure provides a siloxane monomer represented by Chemical Formula 1 below, and the siloxane monomer is used in preparation of a contact lens.

As shown in the above-mentioned Chemical Formula 1, the siloxane monomer has a hydrophilic side chain grafted on a siloxane repeating unit, and the chemical structure of the hydrophilic side chain is shown below.

[Chemical Formula 1]

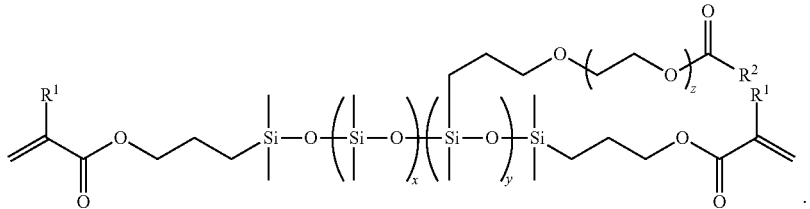

In the [Chemical Formula 1], $R^1$ is H or $CH_3$. $R^2$ is $NHR^3$, $N(R^3)_2$, $OR^3$, $SR^3$, or

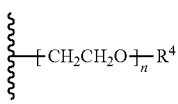

that is substituted by non-halogen, where n is an integer between 0 and 6, and is preferably an integer between 1 and 6. $R^3$ is

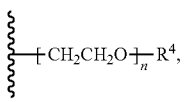

where n is an integer between 0 and 6, and is preferably an integer between 1 and 6. In addition, $R^4$ is H or an alkyl group having a carbon chain length of C1 to C6.

In the [Chemical Formula 1], x is a positive number greater than or equal to zero (x>=0), and is preferably a positive number between 50 and 100; and y is a positive number greater than or equal to 1 (y>=1), and is preferably a positive number between 1 and 20. Furthermore, z is a positive number greater than or equal to zero (z>=0), and is preferably a positive number between 1 and 30.

Among them, a weight average molecular weight (Mw) of the siloxane monomer is between 500 and 50,000, and preferably between 1,000 and 30,000. A number average molecular weight (Mn) of the siloxane monomer is between 500 and 50,000, and preferably between 1,000 and 30,000. Furthermore, a viscosity average molecular weight (Mv) of the siloxane monomer is between 500 and 50,000, and preferably between 1,000 and 30,000. It should be noted that, the units of the above-mentioned molecular weights are all expressed in grams/mole (g/mol).

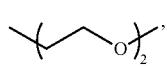

The hydrophilic side chain has a repeating unit based on polyethylene glycol (PEG)

and the hydrophilic side chain further has a ketone structure, such as PEG-C(=O)$R^2$, modified at an end of the polyethylene glycol repeating unit. The hydrophilic side chain further has an $R^2$ substituent modified on the ketone structure, thereby increasing diversity of the chemical structure.

For example, if the atom to which $R^2$ is bonded to PEG-C(=O) is H, the $R^2$ substituent can provide properties of an aldehyde functional group.

For example, if the atom to which $R^2$ is bonded to PEG-C(=O) is C, the $R^2$ substituent can provide properties of a ketone functional group.

For example, if the atom to which $R^2$ is bonded to PEG-C(=O) is N, the $R^2$ substituent can provide properties of an amide functional group.

For example, if the atom to which $R^2$ is bonded to PEG-C(=O) is O or OH, the $R^2$ substituent can provide properties of an ester functional group or a carboxylic acid functional group.

For example, if the atom to which $R^2$ is bonded to PEG-C(=O) is S, the $R^2$ substituent can provide properties of a thioester functional group.

The hydrophilic side chain of the siloxane monomer in the embodiment of the present disclosure is modified based on the ketone structure and expanded to the characteristics of other ketone-derived functional groups, thereby increasing the diversity of the chemical structure.

In a specific embodiment of the present disclosure, the siloxane monomer is represented by Chemical Formula 1-a, where $R^2$ is $CH_3$, which provides the properties of the ketone functional group.

[Chemical Formula 1-a]

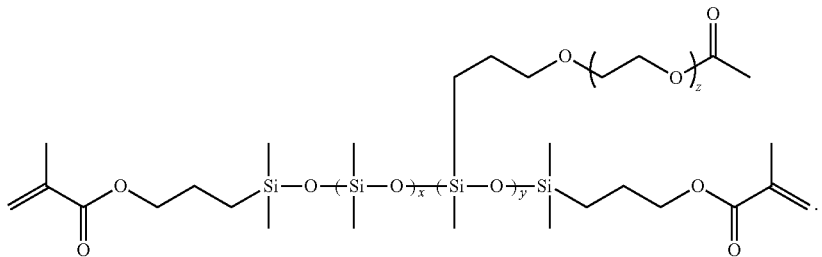

In the [Chemical Formula 1-a], x is between 80 and 90, y is between 3 and 9, and z is between 9 and 15.

It is worth mentioning that in the related art, chemical structures such as polyethylene glycol, polypropylene glycol, or glyceride are widely used as the hydrophilic side chain for hydrophilic modification of siloxane monomers.

It should be understood by those skilled in the art that the chemical structures, such as polyethylene glycol, polypropylene glycol, and glyceride, belong to polyether polyols. The above-mentioned compounds are hydrophilic since oxygen atoms (O) or hydroxyl groups (OH) of the chemical structures easily form hydrogen bonds with water molecules, thereby achieving the purpose of hydrophilicity.

Different from the related art, the siloxane monomer of the embodiment of the present disclosure has the ketone structure on the basis of polyethylene glycol, and further has the modification of $R^2$ substituent.

The technique adopted in the present disclosure can increase diversity of the chemical structure of the siloxane monomer. In addition, since a chemical structure of ketone has a resonance formula as shown below, the ketone can cause a polarization phenomenon of charge separation. The $R^2$ substituent is a multi-electron atom X (i.e., N, O, S), which can promote the polarization phenomenon of charge separation, thereby increasing ionicity of the siloxane monomer, and being conducive to improving the hydrophilicity and moisture retention of the contact lens.

[Resonance Formula of Ketone]

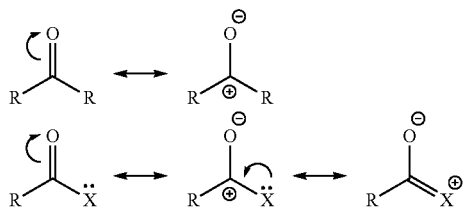

Contact Lens Composition

The embodiment of the present disclosure also provides a contact lens composition. The contact lens composition includes siloxane monomers, a hydrophilic monomer, a crosslinking agent, an initiator, an UV absorber, a co-solvent, and a dye.

The siloxane monomers further includes a first siloxane monomer, a second siloxane monomer, a third siloxane monomer, and/or a fourth siloxane monomer.

The first siloxane monomer is represented by Chemical Formula 1 below.

[Chemical Formula 1]

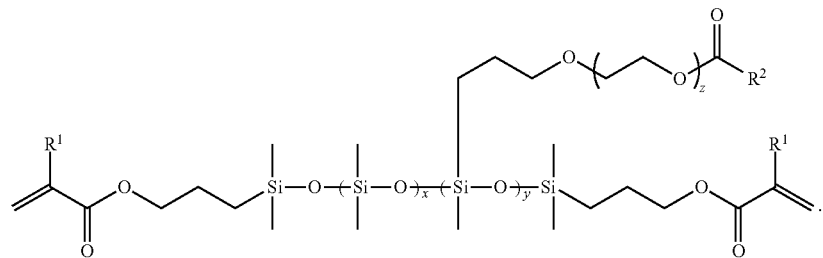

In the [Chemical Formula 1], $R^1$ is H or $CH_3$. $R^2$ is $NHR^3$, $N(R^3)_2$, $OR^3$, $SR^3$, or

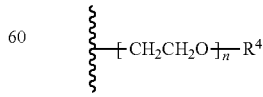

that is substituted by non-halogen, where n is an integer between 0 and 6, and is preferably an integer between 1 and 6. $R^3$ is

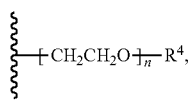

where n is an integer between 0 and 6, and is preferably an integer between 1 and 6. In addition, $R^4$ is H or an alkyl group having a carbon chain length of C1 to C6. In the [Chemical Formula 1], x is a positive number greater than or equal to zero (x>=0), and is preferably a positive number between 50 and 100; and y is a positive number greater than or equal to 1 (y>=1), and is preferably a positive number between 1 and 20. Furthermore, z is a positive number greater than or equal to zero (z>=0), and is preferably a positive number between 1 and 30. In a specific embodiment of the present disclosure, the first siloxane monomer is represented by Chemical Formula 1-a as described above.

The second siloxane monomer is represented by Chemical Formula 2 below.

[Chemical Formula 2]

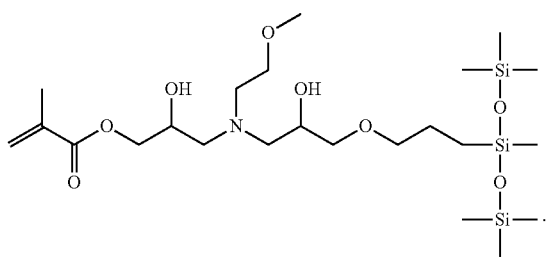

The third siloxane monomer is represented by Chemical Formula 3 below, where x is between 8 and 15.

[Chemical Formula 3]

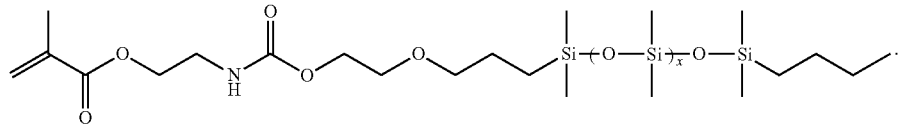

The fourth siloxane monomer is (3-methylacryloxy-2-hydroxy-propoxy)propylbis(trimethylsiloxy)methylsilane.

Based on a total weight of the contact lens composition being 100 parts by weight, an amount of the first siloxane monomer (i.e., the siloxane monomer having Chemical Formula 1) is between 1 part by and 30 parts by weight, preferably between 5 parts by weight and 25 parts by weight, and more preferably between 6 parts by weight and 24 parts by weight. Furthermore, an amount of the second siloxane monomer (i.e., the siloxane monomer having Chemical Formula 2) is between 0 parts by weight and 40 parts by weight, and preferably between 10 parts by weight and 30 parts by weight. An amount of the third siloxane monomer (i.e., the siloxane monomer having Chemical Formula 3) is between 0 parts by weight and 40 parts by weight, and preferably between 10 parts by weight and 35 parts by weight. In addition, an amount of the fourth siloxane monomer is between 0 parts by weight and 30 parts by weight, and preferably between 3 parts by weight and 30 parts by weight.

The hydrophilic monomer is at least one material selected from a group consisting of: 2-hydroxyethyl methacrylate (HEMA), methyl methacrylate (MMA), methacrylic acid (MAA), N-vinyl-pyrrolidone (NVP), N,N-dimethyl-acrylamide (DMA), 4-acryloylmorpholine (AcMO), 2-hydroxyethyl acrylamide (HEAA), glyceryl methacrylate (GMA), glycerol mono-meth acrylate (GMMA), acrylic acid (AA), N-vinyl-N-methyl acetamide, glycine vinyl carbonate, 2-methacryloyloxyethyl phosphorylcholine, and 2-hydroxybutyl methacrylate.

Based on the total weight of the contact lens composition being 100 parts by weight, an amount of the hydrophilic monomer is preferably between 30 parts by weight and 70 parts by weight, and more preferably between 30 parts by weight and 65 parts by weight, but the present disclosure is not limited thereto.

Further, in a specific embodiment of the present disclosure, the hydrophilic monomer is at least one of 2-hydroxyethyl methacrylate (HEMA), methyl methacrylate (MMA), N-vinyl-pyrrolidone (NVP), N,N-dimethyl-acrylamide (DMA), and 4-acryloylmorpholine (AcMO), but the present disclosure is not limited thereto.

The crosslinking agent is at least one material selected from a group consisting of: poly(ethylene glycol) diacrylate (PEGDA), ethylene glycol di(methacrylate) (EGDMA), di(ethylene glycol) di(methacrylate) (DEGDMA), tri(ethylene glycol) di(methacrylate) (TEGDMA), tetra(ethylene glycol) di(methacrylate) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-Triallyl-1,3,5-triazine-2,4,6(1H,3H,5H)-trione, 1,1,1-tri(methylolpropane) tri(methacrylate), tri(methylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(acrylate).

Based on the total weight of the contact lens composition being 100 parts by weight, an amount of the crosslinking agent is preferably between 0.01 parts by weight and 5 parts by weight, and more preferably between 0.1 parts by weight and 3 parts by weight, but the present disclosure is not limited thereto.

Furthermore, in a specific embodiment of the present disclosure, the crosslinking agent is at least one of poly(ethylene glycol) diacrylate (PEGDA) and ethylene glycol di(methacrylate) (EGDMA). A weight average molecular weight (Mw) or a number average molecular weight (Mn) of the poly(ethylene glycol) diacrylate (PEGDA) is between 500 g/mol and 800 g/mol.

The initiator is a photo-initiator. The initiator is at least one material selected from a group consisting of: bis(2,6-difluoro-3-(1-hydropyrrol-1-yl)phenyptitanocene, phenylbis-(2,4,6-trimethylbenzoyl)phosphine oxide, and 2-hydroxy-2-methyl-1-phenyl-1-porpanone.

Based on the total weight of the contact lens composition being 100 parts by weight, an amount of the initiator is preferably between 0.01 parts by weight and 2 parts by weight, and more preferably between 0.05 parts by weight and 1 part by weight, but the present disclosure is not limited thereto.

Furthermore, in a specific embodiment of the present disclosure, the initiator is phenylbis-(2,4,6-trimethylbenzoyl)phosphine oxide.

In order to enhance an ultraviolet light-blocking ability of the contact lens composition, in some embodiments of the present disclosure, the contact lens composition further includes a UV absorber. The UV absorber is at least one material selected from a group consisting of a monomer having benzophenone and a monomer having benzotriazole. Based on the total weight of the contact lens composition being 100 parts by weight, an amount of the UV absorber is between 0.30 parts by weight and 1.80 parts by weight.

Further, in a specific embodiment of the present disclosure, the UV absorber is the monomer having benzotriazole and is 2-[3-(2H-benzotriazole-2-yl)-4-hydroxy-phenyl]-ethyl methacrylate.

In order to improve solubility of the contact lens composition, in some embodiments of the present disclosure, the contact lens composition further includes a co-solvent. The co-solvent is at least one material selected from a group consisting of glycerol (GLY), isopropyl alcohol, n-butanol, t-butanol, t-amyl alcohol (AmOH), and n-hexanol. Based on the total weight of the contact lens composition being 100 parts by weight, an amount of the co-solvent is between 3 parts by weight and 15 parts by weight.

Furthermore, in a specific embodiment of the present disclosure, the co-solvent is at least one of glycerol (GLY) and t-amyl alcohol (AmOH).

In order to enable the contact lens composition to have a specific color, in some embodiments of the present disclosure, the contact lens composition further includes a dye. The dye is at least one material selected from a group consisting of reactive blue 19 (disodium, 1-amino-9,10-dioxo-4-[3-(2-sulfonatooxyethylsulfonyl)anilino]anthracene-2-sulfonate), Sudan III (1-[4-(phenylazo)phenylazo]-2-naphthol), indigo (2,2'-bis(2,3-dihydro-3-oxoindoylidene)), and quinoline yellow (disodium 2-(1,3-dioxo-2,3-dihydro-1H-inden-2-yl)quinolone-6,8-disulfonate).

Based on the total weight of the contact lens composition being 100 parts by weight, an amount of the dye is between 0.002 parts by weight and 0.1 parts by weight.

Furthermore, in a specific embodiment of the present disclosure, the dye is 1% (w/w) reactive blue 19 in HEMA.

Experimental Data and Test Results

Hereinafter, the contents of the present disclosure will be described in detail with reference to Experimental Embodiment 51 to Experimental Embodiment S14. However, the following embodiments are only to aid in the understanding of the present disclosure, and the scope of the present disclosure is not limited to the contents disclosed in these examples. In the above Experimental Embodiments, Experimental Embodiment S1 and Experimental Embodiment S2 are control groups, and the contact lens compositions thereof do not include the siloxane monomer represented by Chemical Formula 1. Experimental Embodiment S3 to Experimental Embodiment S14 are experimental groups for verifying the technical effect of the present disclosure, and the contact lens compositions thereof include the siloxane monomer represented by Chemical Formula 1. The siloxane monomer used in the Experimental Embodiment S3 to Experimental Embodiment S14 is the siloxane monomer represented by Chemical Formula 1-a, but the present disclosure is not limited thereto.

Table 1 below shows the formulations of the contact lens compositions of Experimental Embodiment S1 to Experimental Embodiment S14. The formulations include the amount of each component (e.g., siloxane monomer, hydrophilic monomer, crosslinking agent, initiator, UV absorber, co-solvent, and dyes). Table 1 below also shows the physical and chemical properties of the contact lenses prepared from the contact lens compositions of Experimental Embodiment S1 to Experimental Embodiment S14.

The preparation method of Experimental Embodiment S1 to Experimental Embodiment S14 is to subject the contact lens composition according to the formulation in Table 1 to cross-linking and curing reactions, so as to produce a contact lens.

More specifically, the method for producing the contact lens includes the following steps.

Step 1 includes: injecting a contact lens composition (also called a silicone hydrogel composition) into a mold for forming a contact lens according to the formulation in Table 1.

Step 2 includes: curing and cross-linking the contact lens composition under an irradiation of a light source to form a contact lens (also called a silicone hydrogel lens).

Step 3 includes: extracting the contact lens with water to remove uncured silicone monomers (also called water-soluble silicone macro-monomers).

Step 4 includes: placing the contact lens in a borate-buffered saline solution having a pH value between 7.1 and 7.5 until the contact lens swells. The step 4 is also called a hydration procedure.

Step 5 includes: adding a buffer solution into a packaging container; soaking the contact lens in the buffer solution; then performing a sealing procedure and a sterilization procedure. In this way, the production of the contact lens is completed. Among them, a sealing temperature of the sealing procedure is about 125° C., and a sterilization time of the sterilization procedure is about 30 minutes.

The method for producing the contact lens of the present disclosure can remove the uncured water-soluble silicone macro-monomers without extraction by organic solvent.

Among the components shown in Table 1, the first siloxane monomer is the siloxane monomer represented by Chemical Formula 1-a mentioned in the above embodiment. The second siloxane monomer is the siloxane monomer represented by Chemical Formula 2 mentioned in the above embodiment. The third siloxane monomer is the siloxane monomer represented by Chemical Formula 3 mentioned in the above embodiment. The fourth siloxane monomer is (3-methylacryloxy-2-hydroxy-propoxy)-propylbis-(trimethylsiloxy)-methylsilane. The hydrophilic monomer is 2-hydroxyethyl methacrylate (HEMA), methyl methacrylate (MMA), N-vinyl-pyrrolidone (NVP), N,N-dimethyl-acrylamide (DMA), and/or 4-acryloylmorpholine (AcMO). The crosslinking agent is poly(ethylene glycol) diacrylate (PEGDA) and/or ethylene glycol di(methacrylate) (EGDMA). The initiator is phenyl-bis-(2,4,6-trimethyl-benzoyl)-phosphine oxide. The UV absorber is 2-[3-(2H-benzotriazole-2-yl)-4-hydroxy-phenyl]-ethyl methacrylate. The co-solvent is glycerol (GLY) and/or t-amyl alcohol (AmOH). Further, the dye is 1% (w/w) reactive blue 19 in HEMA.

It should be noted that the total weight of all components in the contact lens composition in Table 1 is 100 parts by weight (or 100 wt %).

Contact lenses made of the contact lens compositions of Experimental Embodiments S1 to S14 are tested for physical and chemical properties, including: oxygen permeability Dk (Barrer), equilibrium water content EWC (wt %), hysteresis (°), Sudan black dyeing penetration rate (%), tensile modulus (MPa), and elongation (%). The relevant measurement methods are described below, and the test results are shown in Table 1.

Oxygen permeability Dk (Barrer) is measured by using an $O_2$ permeometer to measure the oxygen permeability (Dk) according to the polaro-graphic method described in ISO 9913-1. Samples of contact lenses are immersed in pure water equilibrated for at least 12 hours for measurement, and then the oxygen permeability are measured by the $O_2$ permeometer (Model 201T, purchased from Rheder Development Company) in a phosphate-buffered saline solution at 35° C. The oxygen permeability is recorded in Barrer units ($10^{-11}$ ($cm^3$ $O_2$ cm)/($cm^3$ sec mmHg)).

Equilibrium water content EWC (wt %) is measured by a method including measuring a weight of a contact lens after a surface of the contact lens is wetted with water to obtain a hydrated lens weight. The contact lens is further dried in an oven, and a weight of the contact lens is measured in a dry state to obtain a dry lens weight. A weight difference is obtained by subtracting the dry lens weight from the hydrated lens weight. Equilibrium water content EWC (wt %)=(weight difference/hydrated lens weight)×100%.

Hysteresis (°) is measured by using a dynamic contact angle meter DCA-WZ (made by Kyowa Interface Science Co., LTD.) to measure a contact angle hysteresis of a contact lens sample, and using a captive bubble method as a method for measuring the dynamic contact angle. Hysteresis (°) is calculated by measuring the difference between an advancing contact angle and a receding contact angle.

Sudan black dyeing penetration rate (%) (Sudan Black staining test) is measured by a method including preparing 0.5% (w/w) Sudan black dye solution under stirring, and leaving the solution overnight. A contact lens sample is removed from a buffer solution and shaken gently to remove most of the water remaining on the lens surface. The lens sample is then placed in the Sudan black dye solution, prepared according to the above, for 5 minutes. Afterwards, the lens sample is removed from the dye solution, the excess dye solution is rinsed with warm water, and a visible light transmittance (%) of the lens is measured.

Tensile Modulus (MPa) and Elongation (%) are measured by measuring a tensile modulus by using a tensile testing machine, Zwick Z0.5. A contact lens sample is cut to have a width of 2 millimeters. A micrometer is used to measure a thickness of the sample before testing begins. At the beginning of the test, an extension speed of a sample, a length of the sample, and a distance between jaws are kept constant. Each sample is placed in a buffered saline solution during the measurement period. Modulus is recorded in MPa. Elongation is recorded in %.

TABLE 1

| Entry | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| first siloxane monomer | — | — | 8 | 8 | 8 | 8 | 8 | 6 | 7 | 7 | 8 | 6 | 24 | 8 |
| second siloxane monomer | 20 | 30 | 30 | 20 | 23 | 10 | 20 | 23 | 20 | 20 | 20 | 30 | — | 23 |
| third siloxane monomer | 20 | 10 | — | — | 15 | 35 | 25 | 10.5 | 36 | 28 | 15 | — | 19 | 16.5 |
| fourth siloxane monomer | 10 | 10 | 10 | 30 | 5 | 5 | 5 | 4.3 | — | — | — | — | — | — |
| hydrophilic monomer (HEMA) | 3.8 | 3.8 | 3.8 | 5 | 3 | 5 | 5 | 7 | 5 | 6 | 5 | 20 | 10 | 5.5 |
| hydrophilic monomer (MMA) | — | — | — | — | — | — | — | — | — | — | — | 0.2 | — | — |
| hydrophilic monomer (NVP) | 21.64 | 21.64 | 22.64 | 21.44 | 21.44 | 20.44 | 20.44 | 35.33 | 23.04 | 29.94 | 38.04 | 41.88 | 32.12 | 33.62 |
| hydrophilic monomer (DMA) | 8 | 8 | 9 | 5 | 8 | 6 | 6 | — | — | — | — | — | 9 | — |
| hydrophilic monomer (AcMO) | 10 | 10 | 10 | 4 | 10 | 4 | 4 | 6 | 7 | 7 | 5.5 | — | — | 5.50 |
| crosslinking agent (PEGDA) | 0.7 | 0.7 | 0.7 | 0.6 | 0.7 | 0.7 | 0.7 | — | 0.10 | 0.2 | 0.1 | 0.05 | — | — |
| crosslinking agent (EGDMA) | — | — | — | 0.1 | — | — | — | 0.01 | — | — | — | 0.01 | 0.02 | 0.02 |
| initiator | 0.4 | 0.4 | 0.4 | 0.4 | 0.4 | 0.40 | 0.4 | 0.4 | 0.4 | 0.4 | 0.4 | 0.4 | 0.4 | 0.4 |
| UV absorber | 0.89 | 0.89 | 0.89 | 0.89 | 0.89 | 0.89 | 0.89 | 0.89 | 0.89 | 0.89 | 0.89 | 0.89 | 0.89 | 0.89 |
| co-solvent (GLY) | 4 | 4 | 4 | 4 | 4 | 4 | 4 | 2 | — | — | 6.5 | — | — | 2 |
| co-solvent (AmOH) | — | — | — | — | — | — | — | 4 | — | — | — | — | 4 | 4 |
| dye | 0.58 | 0.58 | 0.58 | 0.58 | 0.58 | 0.58 | 0.58 | 0.58 | 0.58 | 0.58 | 0.58 | 0.58 | 0.58 | 0.58 |
| total weight (wt %) | 100 | 100 | 100 | 100 | 100 | 100 | 100 | 100 | 100 | 100 | 100 | 100 | 100 | 100 |

TABLE 1-continued

| Entry | S1 | S2 | S3 | S4 | S5 | S6 | S7 | S8 | S9 | S10 | S11 | S12 | S13 | S14 |
|---|---|---|---|---|---|---|---|---|---|---|---|---|---|---|
| oxygen permeability Dk (Barrer) | 65 | 48 | 45 | 49 | 62 | 74 | 67 | 64 | 75 | 63 | 58 | 51 | 74 | 71 |
| equilibrium water content EWC (wt %) | 49 | 52 | 53 | 37 | 51 | 47 | 41 | 54 | 41 | 47 | 57 | 51 | 51 | 51 |
| hysteresis (°) | 34 | 33 | 18 | 21 | 18 | 23 | 21 | 25 | 14 | 16 | 16 | 23 | 11 | 20 |
| Sudan black dyeing penetration rate (%) | 52 | 47 | 86 | 86 | 79 | 91 | 92 | 85 | 90 | 91 | 93 | 88 | 73 | 89 |
| tensile modulus (MPa) | 0.31 | 0.33 | 0.33 | 0.32 | 0.29 | 0.34 | 0.29 | 0.31 | 0.26 | 0.29 | 0.34 | 0.35 | 0.38 | 0.29 |
| elongation (%) | 285 | 254 | 267 | 248 | 264 | 319 | 297 | 281 | 328 | 317 | 264 | 267 | 243 | 295 |

As shown in Table 1, the contact lens compositions of Experimental Embodiments S3-S14 include the siloxane monomer represented by Chemical Formula 1-a. The hydrophilic side chain of the siloxane monomer, represented by Chemical Formula 1-a, is modified with the chemical structure of ketone. The siloxane monomer has strong hydrophilicity. The contact lenses made of said contact lens compositions also have excellent surface hydrophilic properties. Accordingly, the contact lenses made of the contact lens compositions of Experimental Embodiments S3-S14 do not require the treatment for a hydrophilic surface coating.

Furthermore, the measurement parameters of the hydrophilic properties of the lens surface include hysteresis (°) and Sudan black dyeing penetration rate (%). Among them, the lower the value of Hysteresis (°) is, the better the hydrophilicity of the lens surface is. The higher the value of Sudan black dyeing penetration rate (%) is, the better the hydrophilicity of the lens surface is.

The test results of Experimental Embodiments S1 and S2 show that in the contact lens compositions that do not include the siloxane monomer represented by Chemical Formula 1-a, the values of hysteresis (°) exhibited by the lens surfaces of the contact lenses are about 33° to 34°, while the values of Sudan black dyeing penetration rate (%) are about 47% to 52%.

The test results of Experimental Embodiments S3 to S14 show that in the contact lens compositions that include the siloxane monomer represented by Chemical Formula 1-a, the values of hysteresis (°) exhibited by the lens surfaces of the contact lenses are all less than 30°, and the values of Sudan black dyeing penetration rate (%) are all greater than 70%. That is, the hydrophilicities of the contact lenses made of the contact lens compositions of Experimental Embodiments S3 to S14 are superior to those of Experimental Embodiments 1 and 2.

Furthermore, the contact lenses made of the contact lens compositions of Experimental Embodiments S3 to S14 are not subjected to special surface hydrophilic modification treatment or surface hydrophilic coating treatment. The contact lenses made of the contact lens compositions of Experimental Embodiments S3 to S14 can provide as good an effect as the lenses with lens surface modification treatment by using only the raw material composition. That is to say, the siloxane monomer, represented by Chemical Formula 1-a, can significantly improve the hydrophilicity of the lens surface.

On the whole, the contact lenses of Experimental Embodiments S3 to S14 each have an oxygen permeability between 40 Barrers and 150 Barrers (preferably between 45 Barrers and 75 Barrers), an equilibrium water content between 30% and 80% (preferably between 37% and 57%), a hysteresis between 0° and 30° (preferably between 11° and 25°), a Sudan black dyeing penetration rate between 70% and 99% (preferably between 73% and 93%), a tensile modulus between 0.1 MPa and 0.8 MPa (preferably between 0.26 MPa and 0.38 MPa), and an elongation between 100% and 500% (preferably between 243% and 328%).

Furthermore, among the Experimental Embodiments S3 to S14, the Experimental Embodiment S9 may be considered as the best embodiment, and the Experimental Embodiment S11 is considered as the second best embodiment. The reason is that the oxygen permeability of Experimental Embodiment S9 is high, and the siloxane monomer, represented by Chemical Formula 1-a, can have good miscibility with long-chain silicon monomers and short-chain silicon monomers, which exhibit good mechanical properties with respect to tensile modulus and elongation.

Although Experimental Embodiment S11 is inferior to Experimental Embodiment S9 in terms of tensile modulus and elongation, which is obviously due to the amount of the siloxane monomer, represented by Chemical Formula 1-a, being increased. However, Experimental Embodiment S11 has excellent maintenance of oxygen permeability and hysteresis, which is rare in silicone hydrogel formulation systems.

Further, in order to verify the performance of the surface properties of the contact lens of the present disclosure, the contact lens made of Experimental Embodiment S9 is compared with the commercially available CooperVision products My Day (Stenfilcon A) and Super-Air (Fanfilcon A) and Alcon product PRECISION1™ (Verofilcon A). The comparison is to compare the surface properties of five lenses, which includes the average values of hysteresis (°) and Sudan black dyeing penetration rate (%). It should be noted that, the smaller the value of hysteresis (°) is, the better the hydrophilicity of the lens surface is. The higher the value of the Sudan Black dyeing penetration rate (%) is, the less likely the dye is to be adsorbed on the lens surface, and the better the hydrophilicity of the lens surface is.

The lens surface of PRECISION1™ (Verofilcon A) is known to be treated with a coating process. Therefore, the lens surface of PRECISION1™ (Verofilcon A) has superior performance in terms of hysteresis (°) and Sudan black dyeing penetration rate (%).

Without a coating process, the hysteresis (°) of the lens surface of Experimental Embodiment S9 of the present disclosure is close to that of products such as My Day (Stenfilcon A) and Super-Air (Fanfilcon A) that are with a coating process. The value of Sudan black dyeing penetration rate (%) of Experimental Embodiment S9 of the present disclosure is better than that of the above products, such as My Day (Stenfilcon A) and Super-Air (Fanfilcon A), and even close to that of PRECISION1™ (Verofilcon A). The test results are shown in Table 2 below.

TABLE 2

| product name | My Day (Stenfilcon A) | Super-Air (Fanfilcon A) | PRECISION1 ™ (Verofilcon A) | Experimental Embodiment S9 |
|---|---|---|---|---|
| hysteresis (°) | 12 | 11 | 8 | 14 |
| Sudan black dyeing penetration rate (%) | 43 | 52 | 94 | 90 |

BENEFICIAL EFFECTS OF THE EMBODIMENTS

In conclusion, by virtue of introducing a siloxane monomer having a specific hydrophilic structure into a contact lens composition, the siloxane monomer, the contact lens composition and the contact lens of the present disclosure enable hydrophilicity of a lens surface of the contact lens to be improved without a surface treatment of a hydrophilic coating.

The technique adopted in the present disclosure can increase diversity of the chemical structure of the siloxane monomer. In addition, since a chemical structure of ketone has a resonance formula, the ketone can cause a polarization phenomenon of charge separation. The $R^2$ substituent is a multi-electron atom X (i.e., N, O, S), which can promote the polarization phenomenon of charge separation, thereby increasing ionicity of the siloxane monomer, and being conducive to improving the hydrophilicity and moisture retention of the contact lens.

Furthermore, the contact lens formed of the contact lens composition of the present disclosure can have an excellent surface hydrophilic property, so that a treatment for a hydrophilic surface coating is unnecessary.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A siloxane monomer represented by Chemical Formula 1 below and used in preparation of a contact lens:

[Chemical Formula 1]

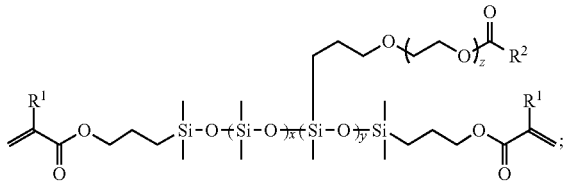

wherein $R^1$ is H or $CH_3$;

wherein $R^2$ is $NHR^3$, $N(R^3)_2$, $OR^3$, $SR^3$, or

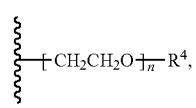

where n is not greater than 6;

wherein $R^3$ is

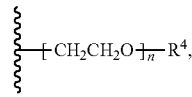

where n is not greater than 6;

wherein $R^4$ is H or an alkyl group having a carbon chain length of C1 to C6; and wherein x is greater than or equal to 0, y is greater than or equal to 1, and z is greater than or equal to 0.

2. The siloxane monomer according to claim 1, wherein a weight average molecular weight (Mw) or a number average molecular weight (Mn) of the siloxane monomer is between 500 g/mol and 50,000 g/mol.

3. A contact lens composition, comprising siloxane monomers, a hydrophilic monomer, a crosslinking agent, and an initiator; wherein the siloxane monomers include a first siloxane monomer, and the first siloxane monomer is represented by Chemical Formula 1 below:

[Chemical Formula 1]

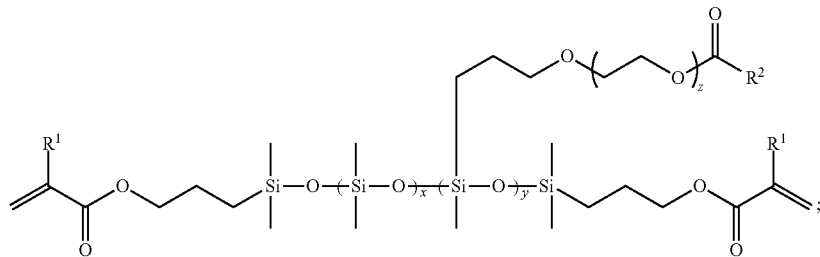

wherein $R^1$ is H or $CH_3$; $R^2$ is $NHR^3$, $N(R^3)_2$, $OR^3$, $SR^3$, or

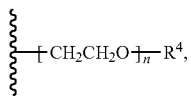

where n is not greater than 6; $R^3$ is

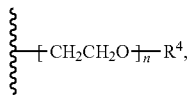

where n is not greater than 6; and $R^4$ is H or an alkyl group having a carbon chain length of C1 to C6; wherein x is greater than or equal to 0, y is greater than or equal to 1, and z is greater than or equal to 0.

4. The contact lens composition according to claim 3, wherein the siloxane monomers further include at least one of a second siloxane monomer, a third siloxane monomer, and a fourth siloxane monomer;
wherein the second siloxane monomer is represented by Chemical Formula 2 below:

[Chemical Formula 2]

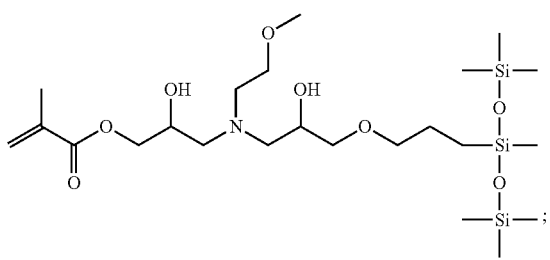

wherein the third siloxane monomer is represented by Chemical Formula 3 below:

wherein the fourth siloxane monomer is (3-methylacryloxy-2-hydroxy propoxy)propylbis(trimethylsiloxy)methylsilane.

5. The contact lens composition according to claim 4, wherein, based on a total weight of the contact lens composition being 100 parts by weight, an amount of the first siloxane monomer is between 1 part by weight and 30 parts by weight, an amount of the second siloxane monomer is not greater than 40 parts by weight, an amount of the third siloxane monomer is not greater than 40 parts by weight, and an amount of the fourth siloxane monomer is not greater than 30 parts by weight.

6. The contact lens composition according to claim 5, wherein the hydrophilic monomer is at least one material selected from a group consisting of: 2-hydroxyethyl methacrylate (HEMA), methyl methacrylate (MMA), methacrylic acid (MAA), N-vinyl pyrrolidone (NVP), N,N-dimethyl-acrylamide (DMA), 4-acryloylmorpholine (AcMO), 2-hydroxyethyl acrylamide (HEAA), glyceryl methacrylate (GMA), glycerol mono-meth acrylate (GMMA), acrylic acid (AA), N-vinyl-N-methyl acetamide, glycine vinyl carbonate, 2-methacryloyloxyethyl phosphorylcholine, and 2-hydroxy-butyl methacrylate; wherein an amount of the hydrophilic monomer is between 30 parts by weight and 70 parts by weight.

7. The contact lens composition according to claim 5, wherein the crosslinking agent is at least one material selected from a group consisting of: poly(ethylene glycol) diacrylate (PEGDA), ethylene glycol di(methacrylate) (EGDMA), di(ethylene glycol) di(methacrylate) (DEGDMA), tri(ethylene glycol) di(methacrylate) (TEGDMA), tetra(ethylene glycol) di(methacrylate) (TTEGDMA), allyl methacrylate (AMA), ethylene glycol di(allyl ether) (EGDAE), tri(ethylene glycol) di(allyl ether) (TEGDAE), tetra(ethylene glycol) di(allyl ether) (TTEGDAE), 1,3,5-Triallyl-1,3,5-triazine-2,4,6(1H,3H,5H)-trione, 1,1,1-tri(methylolpropane) tri(methacrylate), tri(methylolpropane) tri(acrylate), pentaerythritol tetra(acrylate), tetra(ethylene glycol) di(acrylate), ethylene di(acrylamide), butylene 1,4-di(acrylamide), and poly(ethylene glycol) di(acrylate); wherein an amount of the crosslinking agent is between 0.01 parts by weight and 5 parts by weight.

[Chemical Formula 3]

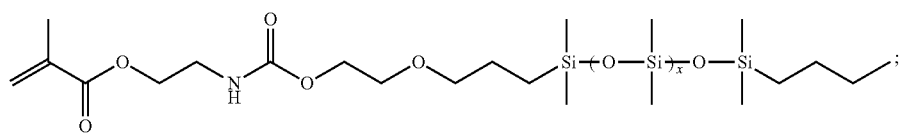

8. The contact lens composition according to claim 5, wherein the initiator is at least one material selected from a group consisting of: bis(2,6-difluoro-3-(1-hydropyrrol-1-yl)-phenyptitanocene, phenylbis-(2,4,6-trimethyl-benzoyl) phosphine oxide, and 2-hydroxy-2-methyl-1-phenyl-1-porpanone; wherein an amount of the initiator is between 0.01 parts by weight and 2 parts by weight.

9. A contact lens, which is made of the contact lens composition as claimed in claim 3, the contact lens having the following characteristics: a surface of the contact lens having a hysteresis of less than 30°, and a dyeing penetration rate of the contact lens being greater than 70% after being dyed with Sudan black dye.

10. The contact lens according to claim 9, wherein the contact lens further has the following characteristics:
   (i) an oxygen permeability between 40 Barrers and 150 Barrers;
   (ii) an equilibrium water content between 30% and 80%;
   (iii) the hysteresis between 0° and 30°;
   (iv) the dyeing penetration rate between 70% and 99.9%;
   (v) a tensile modulus between 0.1 MPa and 0.8 MPa; and
   (vi) an elongation between 100% and 500%.

* * * * *